Aug. 10, 1943.   O. J. STEINWAND   2,326,407
METHOD OF TREATING FRUIT
Filed Aug. 19, 1940
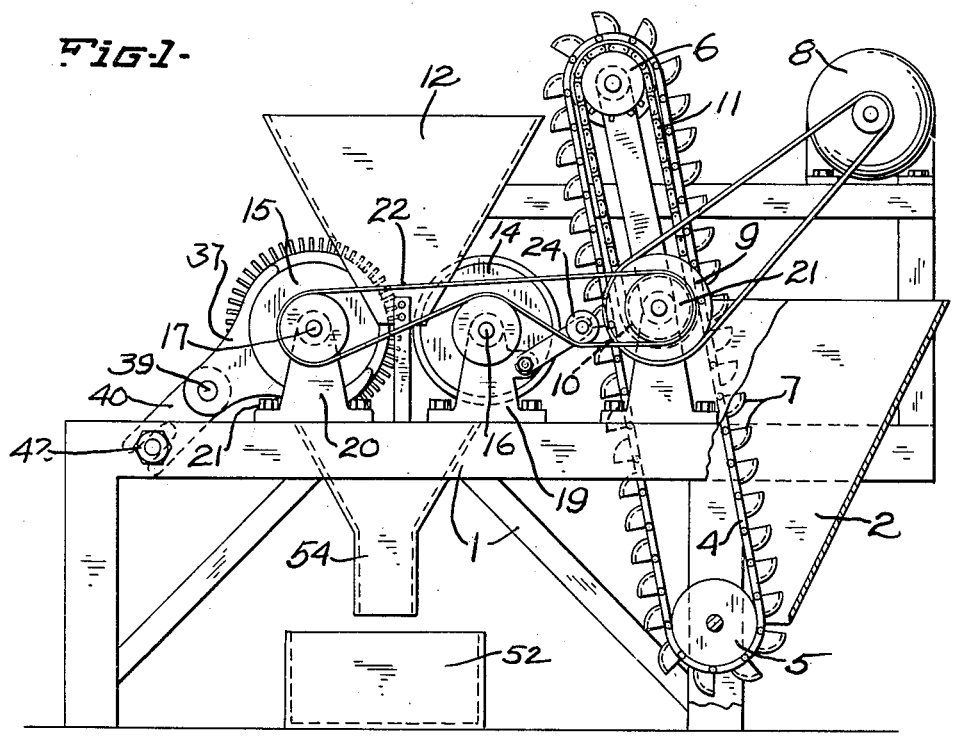
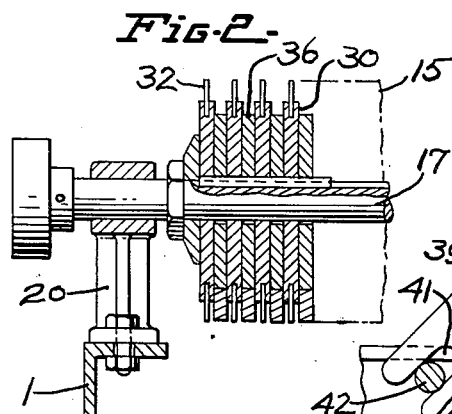
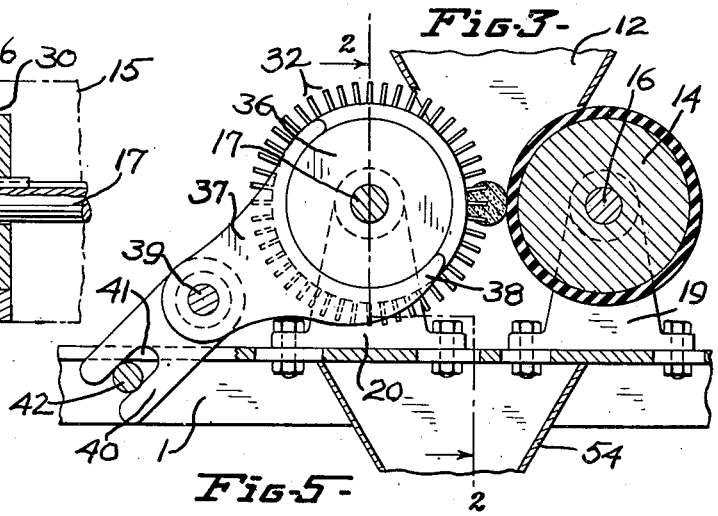
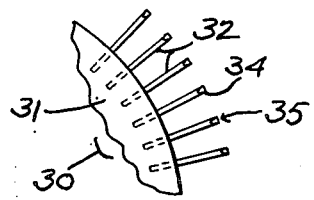
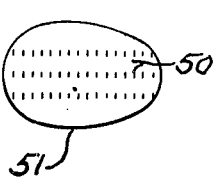
INVENTOR.
OTTO J. STEINWAND
BY Lippincott & Metcalf
ATTORNEYS.

Patented Aug. 10, 1943

2,326,407

UNITED STATES PATENT OFFICE 2,326,407

METHOD OF TREATING FRUIT

Otto J. Steinwand, Oakland, Calif., assignor to S & W Fine Foods, Inc., San Francisco, Calif., a corporation of California Application August 19, 1940, Serial No. 353,254

6 Claims. (Cl. 99—103)

My invention relates to a means and method for treating fruit and is particularly applicable to grapes and similar soft pulped fruit having a skin thereon, which may render the fruit slow to absorb sugar when said fruit is glacéd or candied. This application is a continuation-in-part of my prior application, Serial No. 300,791, filed October 23, 1939, and the present invention is particularly valuable for use in conjunction with the treatment set forth in said prior application.

Among the objects of my invention are: To provide a means and method of preventing fruit from cracking and shrinking during treatment with sugar syrup; to provide a means and method for preparing grapes for a glacé treatment; to provide a means and method of processing grapes in a heavy sugar syrup; to provide a means and method for maintaining the contour of grapes during processing; and to provide a means and method of controlling the contour of fruit having a soft pulp and a skin.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

In my prior application mentioned above, I have described a process for treating grapes and the like by soaking the fruit in a weak solution of sodium hydroxide, potassium hydroxide, or ammonia, or a combination of these alkalies so that the cellulose, fibrous, and starchy parts of the fruit will become modified to an extent that the treated fruit may be boiled in water or sugar syrup without checking, cracking, or splitting of the skin.

Furthermore, I have found that such treatment prevents fruit, such as grapes for example, from cooking into a sauce when boiled, and consequently such treated soft pulped fruit can be passed through the various stages of hot sugar syrup processing without material change in contour. In my prior application, I have suggested that the fruit be treated with from three to eight per cent of the hydroxide at from sixty to ninety degrees Fahrenheit. Additional treatments are also set forth in my prior application which are of no particular importance with respect to the present application, the main object of which is to accelerate the transfusion of sugar syrup into the fruit which has been treated with hydroxide in order that time may be saved in processing and that a desirable plump, full fruit contour be maintained.

While I am not able to state the exact chemical reaction which takes place when fruit, such as grapes, are treated with hydroxide, some change has been made in the condition of the skin and body or pulp of the treated fruit so that sugar enters slowly, and the processing of the fruit through various increasing concentrations of sugar in water requires considerable time.

Broadly, as to apparatus, I have provided a machine for pricking or puncturing the skin and pulp of fruit treated in the hydroxide so that the sugar has direct access to the pulp of the fruit. Such punctured fruit accepts sugar syrups far more rapidly than the unpunctured fruit and thus the hydroxide treated fruit may be glacéd or candied in a relatively short time. Furthermore, I have found that this puncturing of the fruit skin and pulp need not be entirely around the fruit and that even with the ready access of the syrup to the pulp of the treated fruit, the pulp of the fruit when boiled has no tendency to soften nor shrink. Thus, utilizing the broad method of my invention, I am able to take grapes, for example, which in their natural condition cannot stand boiling without softening, treat these grapes with the hydroxide to modify both the pulp and the skin, and then puncture the skin and pulp to allow quick access of the sugar to the pulp of the fruit. I have also found that the hydroxide treatment so strengthens the fruit that it may be machine punctured without danger of breakage, splitting, or rupture of the skin during the puncturing operation, and the fruit remains firm and plump.

In the drawing:

Fig. 1 is a side view in elevation of a preferred form of puncturing machine for handling hydroxide treated grapes, such as, for example, the varieties known in California as "Thompson seedless."

Fig. 2 is a view, partly in elevation and partly in section, through the puncturing roller.

Fig. 3 is a view, partly in section and partly in elevation, of the cooperating puncturing and guide rollers.

Fig. 4 is a detailed view of the puncturing needles.

Fig. 5 is a diagram of a grape surface showing the linear type punctures produced by the needles of the device.

I will describe my invention as applied to the processing of Thompson seedless grapes, or similar varieties, which are a relatively small, soft-skinned grape with no seeds. These grapes are not, either when fresh or preserved in fruit pickling brine, adapted to be processed into heavy sugar syrup either as glacéd or candied fruit. Such grapes, when boiled, ordinarily cook into a sauce, will not hold their shape, and are generally unsatisfactory for the glacéing purposes, although ideal from the point of view of size, shape, flavor, and texture, if glacéing can be properly accomplished.

In the carrying out of my process I utilize either fresh grapes, grapes in salt brine, or grapes in pickling brine, the latter brine being a solution of sulphur dioxide and water with or without additional salt, as is well known in the art. The grapes are usually purchased in lug boxes and may be dumped into barrels while still on their stems for the hydroxide treatment. For grapes, the following formula gives good results, as outlined in my above-cited application:

|  | Per cent |
|---|---|
| Sodium hydroxide | 4 |
| Sodium sulphite | 3 |
| Sodium chloride | 5 |
| Water | 88 |

This mixture is poured upon the grapes and left to act thereon for a period of from ten to twenty-four hours up to several days, in accordance with the size of the grapes and the variety being treated. The extent of "hardening" by the hydroxide action upon the grapes may be made known by sampling, if desired. The grapes, during this treatment, do not shrink but maintain a firm, plump appearance.

After the end of the hydroxide treatment, the hydroxide is removed from the grapes by washing in flowing water, such a process usually being accomplished by applying running water to the top of the barrel and siphoning the water from the bottom thereof. After the treatment with the hydroxide and wash out, the grapes may thereafter be known as "treated grapes."

The treated grapes may then be stemmed and graded for immediate processing, or may be placed in a holding solution such as salt brine alone, a combination of salt and sulphur dioxide in water; and held for further processing.

The fruit in this connection will keep almost indefinitely in the holding solution without fermenting and thus may be processed during off-season time, as desired. When the holding solution is washed out, the fruit is ready for stemming, grading and further processing, or the fruit may be stemmed and graded before being held.

The hydroxide treated grapes in this stage are firm, hard, and plump and may be made ready for further processing by blanching, dyeing, or similar preliminary steps, and then are delivered to the puncturing machine, as shown in the drawing. Referring thereto, frame 1 is provided, having at one end thereof a hopper 2 into which the stemmed grapes are deposited in bulk and preferably already graded. One side of the hopper 2 is open, this opening being closed by endless conveyor 4 traveling around lower pulley 5 and upper pulley 6. Conveyor belt 4 is provided with a plurality of cross bars 7, on which grapes from hopper 2 are picked up in alined horizontal rows, these bars being preferably shaped to hold one grape only per grape unit length of bar. Upper pulley 6 is driven by motor 8 through intermediate pulley 9 as a conveyor pulley 10 is attached thereto, driving upper pulley 6 through conveyor chain or belt 11.

As the conveyor 4 rotates, bars 7 pick up grapes, carry them over upper pulley 6, and discharge them on the other side of pulley 6 into intermediate hopper 12 in relatively small increments. The outlet of intermediate hopper 12 comprises a space between a guide roller 14 and composite puncturing roller 15, these rollers being mounted on parallel axles 16 and 17, respectively, axle 16 being mounted on sliding bearing 19 carried by frame 1 and axle 17 being mounted on a slidable bearing 20 also mounted on frame 1 to move horizontally thereon and held in adjustment by bolts 21 passing through slots in frame 1.

The two rollers 14 and 15 are revolved in opposite directions toward the center of hopper 12 by roller belt 22 driven by roller pulley 23 attached to intermediate pulley 9, belt 21 being tightened by take-up roller 24. Thus, the grapes are picked up in hopper 2, delivered into intermediate hopper 12, and pass out of hopper 12 between rollers 14 and 15.

Composite roller 15 is the puncturing roller and is shown in more detail in Figs. 2 and 3. The composite puncturing roller 15 comprises a plurality of needle discs 30 keyed to shaft 17. These needle discs have a solid main body portion 31 and have a plurality of needles 32 projecting outwardly along radial lines from the periphery thereof. These needles terminate in a chisel end 34, the chisel edge 35 being parallel to the plane of disc 30 for ease of sharpening, inasmuch as each disc 30 may be mounted in a rotating device such as a lathe and the needles sharpened by a file or abrasive while the disc is rotating, thereby saving a great deal of time in sharpening the needles. Each disc carries only one row of needles and between each disc 30 is positioned a spacing disc 36 having a diameter less than that of the body portions 31 of discs 30.

Ejector plates 37 are provided between each needle disc 30 and have a substantially semi-circular bearing on each spacing disc 36, the lower horn 38 serving as an ejector between each row of needles. All of the ejector plates are mounted on an ejector plate shaft 39, this shaft at each end thereof being provided with an adjustment plate 40 having a slot 41 at the end thereof. The two adjustment plates 40 are held to frame 1 by lock bolt 42. The entire puncturing roller assembly and guide roller 14 may therefore be moved to different spacings, thus providing an adjustment for grapes of different sizes as determined by the grading process, and to determine the penetration of the needles.

In operation, hopper 2 is filled with grapes and motor 8 is started. The grapes are carried over and dumped into intermediate hopper 12, in successive increments. The bars distribute the grapes across the puncturing rollers and most of them arrive singly and horizontally spaced on the needle area. No crowding or jamming occurs, as one increment can enter the rollers before the next increment arrives therebetween. The grapes pass between the puncturing roller 15 and guide roller 14, being impaled upon the needles with almost a straight puncturing movement, thus preventing tearing of the inner pulp of the fruit. The puncturing needles are preferably adjusted to pass slightly more than halfway through the fruit but do not pass through the opposite skin of the fruit. I have found that three rows of punctures 50 on one side of fruit 51, as shown in Fig. 5, are quite sufficient to give complete transfusion of sugar into the interior pulp of the fruit, and such few punches do not detract from the looks of the fruit, nor impair the solidity thereof.

After the fruit has been impaled upon the needles, the fruit is carried around puncturing roller 15 and very gradually starts to bear against the ejector plate horns 38, the outer surfaces of which extend tangentially beyond the needle path. Thus, the fruit is gradually forced off the needles to drop into container 52 positioned beneath the rollers 14 and 15 guided by chute 54, this forcing of the fruit off from the needles being so gradual that again the fruit pulp is not torn by motion of the needles within the fruit.

After the fruit has been punctured, it may then be placed in a light sugar solution, with or without heating, to start initial absorption, and may thereafter be rapidly carried up through the various grades of sugar syrup concentrations until the final high concentration of sugar with heat is reached. The fruit may then be completely drained and exposed to air if glacéd fruit, or may be packed in heavy syrup as candied fruit for use by bakeries, or for other consumption. I have found that by combining the treatment of the fruit in hyroxide to modify the material thereof and render it capable of withstanding the boiling processes, with the puncturing of the treated fruit to allow ready access of the sugar to the interior thereof, the time required for processing is tremendously decreased. For example, I have found that hydroxide treated grapes without puncturing will take approximately thirty days to properly carry them up to the final glacé without shrinkage, whereas the hydroxide treated-punctured fruit can be carried to the same stage in about three days.

I wish to bring out, however, that neither the hydroxide treatment alone, nor the puncturing alone, can accomplish this result; both steps must be used because punctured grapes which have not been treated by the hydroxide cannot be satisfactorily glacéd any more than can unpunctured grapes. Hydroxide treated grapes alone require a long processing period because the sugar is slow to invade the pulp. Consequently, by the use of the hydroxide treatment I am able to cause the grapes to withstand the necessary boiling, and by the puncturing I am able to greatly reduce the time required for the sugar treatment, and still obtain a firm plump glacéd fruit.

I claim:

1. The method of treating whole grapes normally subject to disintegration in boiling liquids and the like comprising subjecting the whole grape to the hydrolyzing action of a sodium hydroxide solution to modify the cellulose, fibrous, and starchy parts of the fruit and to preserve said grape against checking, cracking, or splitting under application of heat thereto, puncturing the skin and pulp, and impregnating said grapes in sugar syrup under heat.

2. The method of treating whole grapes normally subject to disintegration in boiling liquids and the like comprising subjecting the whole grape to the hydrolizing action of a sodium hydroxide solution to modify the cellulose, fibrous, and starchy parts of the fruit and to preserve said grape against checking, cracking, or splitting under application of heat thereto, washing out the hydroxide in water, puncturing the modified skin and pulp, and impregnating said grapes in sugar syrup under heat.

3. The method if impregnating whole grapes normally subject to disintegration in boiling liquids with heavy syrup comprising subjecting the whole grape to the hydrolizing action of a sodium hydroxide solution to modify the cellulose, fibrous, and starchy parts of the fruit and to preserve said grape against checking, cracking, or splitting under application of heat thereto, puncturing the skin and pulp of the hardened fruit, and boiling the fruit in heavy sugar syrup.

4. The method of impregnating whole grapes normally subject to disintegration in boiling liquids with heavy syrup comprising subjecting the whole grape to the hydrolizing action of a sodium hydroxide solution to modify the cellulose, fibrous, and starchy parts of the fruit and to preserve said grape against checking, cracking, or splitting under application of heat thereto, puncturing the skin and pulp of the modified fruit, starting the fruit in a weak sugar syrup and finally boiling said fruit in heavy syrup until impregnated therewith.

5. The method of impregnating whole grapes normally subject to disintegration in boiling liquids with heavy syrup comprising subjecting the whole grape to the hydrolizing action of a sodium hydroxide solution to modify the cellulose, fibrous, and starchy parts of the fruit and to preserve said grape against checking, cracking, or splitting under application of heat thereto, puncturing both the skin and pulp of the modified fruit, soaking said fruit in syrups of increasingly high sugar concentration, and finally boiling said fruit in heavy syrup until impregnated therewith.

6. The method of treating whole grapes normally subject to disintegration in boiling liquids and the like comprising subjecting the whole grape to the hydrolizing action of a sodium hydroxide solution to modify the cellulose, fibrous, and starchy parts of the fruit and to preserve said grape against checking, cracking, or splitting under application of heat thereto, puncturing the skin and pulp substantially normal to the long axis of said fruit, and impregnating said grapes in sugar syrup under heat.

OTTO J. STEINWAND.